US008715078B1

(12) United States Patent
White et al.

(10) Patent No.: US 8,715,078 B1
(45) Date of Patent: May 6, 2014

(54) ADVERTISING AND GOLF PRACTICE DEVICE

(76) Inventors: Keith D. White, Mansfield, TX (US); Kevin N. White, Grand Prairie, TX (US)

( * ) Notice: Subject to any disclaimer, the term of this patent is extended or adjusted under 35 U.S.C. 154(b) by 402 days.

(21) Appl. No.: 13/237,036

(22) Filed: Sep. 20, 2011

Related U.S. Application Data

(60) Provisional application No. 61/384,704, filed on Sep. 20, 2010.

(51) Int. Cl.

| | |
|---|---|
| ***G06F 17/00*** | (2006.01) |
| ***G09F 23/00*** | (2006.01) |
| ***G09F 23/04*** | (2006.01) |
| *A63B 63/00* | (2006.01) |
| *A63B 71/00* | (2006.01) |

(52) U.S. Cl.

CPC ................ *G09F 23/00* (2013.01); *G09F 23/04* (2013.01); *A63B 63/00* (2013.01); *A63B 71/00* (2013.01)

USPC ................................ 463/34; 463/30; 473/154

(58) Field of Classification Search

CPC ......... G09F 23/00; G09F 23/02; G09F 23/04; A63B 63/00; A63B 71/00

USPC ................................ 463/30, 31, 34; 473/154

See application file for complete search history.

(56) References Cited

U.S. PATENT DOCUMENTS

| | | | | |
|---|---|---|---|---|
| 4,963,314 | A | 10/1990 | Gering et al. | |
| 5,478,077 | A * | 12/1995 | Miyahara | 473/154 |
| 7,121,945 | B2 * | 10/2006 | Suganuma et al. | 463/34 |
| 7,266,832 | B2 * | 9/2007 | Miller | 725/34 |
| 7,693,863 | B2 * | 4/2010 | Martin et al. | 707/603 |
| 8,414,408 | B2 * | 4/2013 | Nicora | 473/156 |
| 2005/0089834 | A1 * | 4/2005 | Shapiro | 434/323 |
| 2007/0021033 | A1 * | 1/2007 | Sears | 446/391 |
| 2007/0078018 | A1 * | 4/2007 | Kellogg et al. | 473/151 |
| 2011/0070981 | A1 * | 3/2011 | Allshouse et al. | 473/476 |

FOREIGN PATENT DOCUMENTS

| | | | | |
|---|---|---|---|---|
| EP | 136217 | A1 * | 4/1985 | G09F 9/00 |

* cited by examiner

*Primary Examiner* — Michael Cuff

(74) *Attorney, Agent, or Firm* — James Sonntag

(57) ABSTRACT

An advertising and golf training device is provided with a ball impact detector, image display, a database of advertising images, controller for selecting an image from the database for display and displaying the image upon display in response to signal from the ball impact detector, and confirmation system.

11 Claims, 1 Drawing Sheet

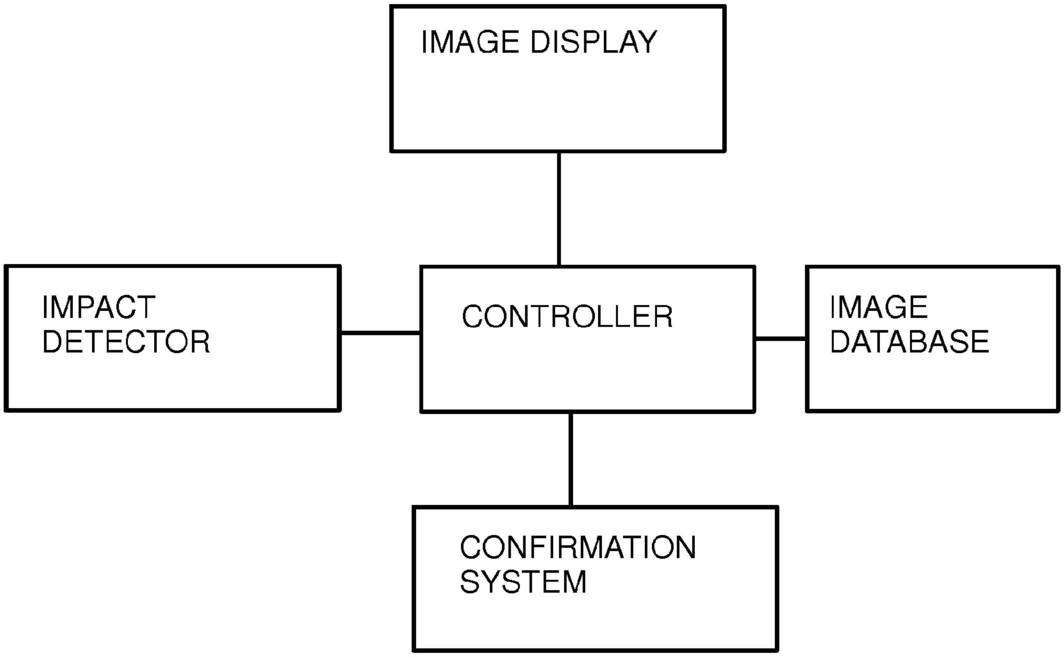
IMAGE DISPLAY
IMPACT DETECTOR
CONTROLLER
IMAGE DATABASE
CONFIRMATION SYSTEM

ADVERTISING AND GOLF PRACTICE DEVICE

CROSS REFERENCE TO RELATED APPLICATIONS

Priority is claimed from U.S. Provisional Patent Application 61/384,704, filed Sep. 20, 2011, which is hereby incorporated by reference

SUMMARY

An aspect is an advertising and golf practice device. The device is to assist a golfer in learning to keep his head down through the golf swing, while presenting an advertising message. In use the golfer addresses the golf ball with club in hand with the device display and impact detector sitting beyond the ball an appropriate distance (e.g., approximately 6 inches) in line with golfers eyes, club and ball. When the club is brought through impact with ball, the ball impact detector detects the impact and the system generates an image on the display. The image is selected in an apparently random fashion from a set of images that includes those of an advertising or promotional nature. The images and can include text, graphic, logos, and the like. The image is displayed for a determined time, such as a half second, on the display to enable the golfer to see it as he swings. If the golfer lifts the head he will not see the displayed image. However, if his head is down with eyes still directed to near where the ball was, the image will be seen. To make sure the golfer actually saw the image, there is a confirmation or review system to review what the image was and confirm to the golfer that the image actually presented was what the golfer thought he saw.

The advantages of the present device are that it gives the golfer a perceived benefit, improvement of his golf swing, while presenting advertising messages. Because of this benefit, the golfer will not be motivated to ignore or quickly forget the advertising message. To the contrary, for the golfer to receive a beneficial training from the device, he is compelled to see the image and concentrate and retain the image sufficiently long for him to confirm the image. Accordingly, the advertising value of the device is enhanced. It insures that the user sees and comprehends the image, which contrasts to passive advertising systems where the user may see the advertising with inattention and ignore the message.

BRIEF DESCRIPTION OF DRAWINGS

The FIGURE is a block diagram illustrating an advertising and golf practice device.

DETAILED DESCRIPTION

An embodiment is a device comprising ball impact detector, image display, a database of advertising images, controller for selecting an image from the database for display and displaying the image upon display in response to signal from the ball impact detector, and confirmation system.

The ball impact detector can be any suitable system for detecting impact of the club face with the ball. It is configured and disposed close enough to the ball position to detect the impact is distinguish it from other activities. The may include one or more of any suitable device that detects motion or sound, such as, for example, sound detector, pressure variation detector, optical detector, Doppler shift detector, and the like. The sound detector may optionally include a sound filter to distinguish the sound of the impact from other loud noises. Such a filter may include software that recognizes the signature of an impact.

The display can be any suitable display, such as an image LED display, CRT display, or an image projector. The display should be placed sufficiently near to the ball so that the golfer can easily see it while his eyes are on the ball.

As an example, the device can be a programmable device, such as a smart phone. The golfer places the phone near the ball where he can see its display while looking the ball, near enough to the ball for its microphone to detect the impact. To prevent accidental hitting of the phone with the club, the phone is placed far enough from the ball or an optional protection device or shield can be provided.

The device also includes a database of advertising images that are presented when the ball impact detector detects an impact. A controller selects and displays the images upon a signal from the impact detector. The images can be randomly selected from the database, or selected on a programmed system where images are weighted to selected more often, but are presented in a non-repeating and, to the golfer, an apparently random fashion. The weighting can be any suitable system, and may include, for example, a system for ensuring a certain image or class of images is selected for a preset percentage of times over used of the device. The weighted image or class of images may be associated with a particular advertiser, or class or goods and services, and be based in whole or part upon the golfers preferences.

The digital images can be stored directly on the device, or be accessed from an external storage site by any suitable system, such as an Internet or wireless communication, cellphone network, or a computer connection (e.g. a USB connection, wireless connection, Wi-Fi). The images can also be periodically updated or replaced by any suitable system, and can be automatic when the device is activated, or updated manually by the user. The images may also be provided by a third party, such any number of services that generate ads for web pages, computer applications, smart-phone applications, and the like.

The images can be static displays, or include animations and flashing. The image is presented sufficiently long for the golf swing to be completed and to draw the golfer's attention sufficiently to keep his head and eyes down during the swing, for example, about a half a second.

After the swing is completed the display shuts off the image, and the golfer uses a confirmation system to determine if he actually saw the image (i.e., kept his head down during the swing). The confirmation can be made by the device automatically redisplaying the same image so that the golfer can confirm it. The redisplaying can be after a suitable duration after the ball impact (for example, at least 5 seconds) to ensure that the swing is fully completed.

The confirmation can also be activated by the golfer manually activating the redisplay of the image, using any suitable system. For example, a tactile detector (button, touch screen) that is activated by touching with a finger, or tapping with a golf club can be used. Alternately, the detection components used for the impact detector can also be used to detect a sound (e.g., voice) command, or, for example, a club or hand movement by the golfer. The redisplay may be on the display near the ball position originally used to display the image, or displayed on a second display, such as a computer display screen.

As an example, if the device is a smart phone, the confirmation can be activated by touching the phone key pad, any of its buttons, or the microphone can be used to receive a distinctive voice command.

Referring to the FIGURE, an exemplary device comprises a controller that controls images on the image display. It receives signals from the impact detector which displays images retrieved from the image database. Confirmation of the image is determined by the confirmation system, which is an automatic or manual representation image for the user to confirm that he saw original presentation of the image.

The device can be implemented in several ways. For example, (1) by a hard wired device integrating all of the functions, placed near the ball, (2) a programmable computer with the impact detector and display near the ball position that are connected to a PC or laptop that is programmed, and a display to redisplay the image, or (3) a programmable portable device with a suitable microphone and display (smart phone, audio/video player, hand held computer).

While this invention has been described with reference to certain specific embodiments and examples, it will be recognized by those skilled in the art that many variations are possible without departing from the scope and spirit of this invention, and that the invention, as described by the claims, is intended to cover all changes and modifications of the invention which do not depart from the spirit of the invention.

What is claimed is:

1. A device comprising:

ball impact detector, image display, a database of advertising images, controller for selecting an image from the database for display, displaying the image upon display in response to signal from the ball impact detector, confirmation system for redisplaying the image in a manner that allows a user to review the initial display and to provide confirmation that the initial display was actually seen by the user.

2. A device as in claim 1 wherein the ball impact detector compromises one or more of sound wave detector, pressure variation detector, optical detector, Doppler shift detector.

3. A device as in claim 1 wherein the display is a led display, image projection display, or CRT display.

4. A device as in claim 1 wherein the database of advertising images comprises digital images stored upon a data storage device.

5. The device as in claim 4 wherein the data storage device is external storage and is accessed through the Internet or over a wireless data link.

6. The device as in claim 4 wherein the data storage device is internally integrated with the device and the images are preprogrammed into the device, or are updatable through the Internet or through wireless communication.

7. The device as in claim 1 wherein the controller randomly selects the images.

8. The device as in claim 1 wherein the controller selects images based upon the programmed system where a certain image or class of images is weighted to be more frequently displayed.

9. The device as in claim 1 wherein the display is varied or animated.

10. The device as in claim 1 wherein the device is a programmable device with a microphone that functions as the ball impact detector, and a led display that functions as the image display.

11. The device as in claim 10 wherein the programmable device is a smart phone, audio/video player or a hand held computer.

* * * * *